United States Patent
Basque et al.

(10) Patent No.: US 6,826,892 B2
(45) Date of Patent: Dec. 7, 2004

(54) VERTICAL FORM, FILL AND SEAL MACHINE FOR HANDLING LARGE POUCHES

(75) Inventors: Roland Basque, Brossard (CA); Geoff J. Knowers, Houston, TX (US)

(73) Assignee: Glopak Inc., Montreal (CA)

( * ) Notice: Subject to any disclaimer, the term of this patent is extended or adjusted under 35 U.S.C. 154(b) by 16 days.

(21) Appl. No.: 10/339,826

(22) Filed: Jan. 9, 2003

(65) Prior Publication Data

US 2004/0134165 A1 Jul. 15, 2004

(51) Int. Cl.⁷ .......................... B65B 61/28; B65B 61/00
(52) U.S. Cl. ............................ 53/410; 53/426; 53/451; 53/133.2; 53/167; 53/551
(58) Field of Search .................. 53/550–552, 133.2, 53/167, 450, 451, 410, 412, 426, 526, 502

(56) References Cited

U.S. PATENT DOCUMENTS

| | | | | |
|---|---|---|---|---|
| 3,738,080 A | * | 6/1973 | Reil | 53/551 |
| 4,027,459 A | * | 6/1977 | Nieskens et al. | 53/500 |
| 4,566,250 A | * | 1/1986 | Matsumura et al. | 53/133.2 |
| 4,656,813 A | * | 4/1987 | Baldini et al. | 53/133.2 |
| 4,938,003 A | * | 7/1990 | Seppala | 53/552 |
| 5,038,550 A | * | 8/1991 | Wirsig et al. | 53/451 |
| 5,473,866 A | * | 12/1995 | Maglecic et al. | 53/552 |
| 5,832,701 A | * | 11/1998 | Hauers et al. | 53/551 |

FOREIGN PATENT DOCUMENTS

| | | | | | |
|---|---|---|---|---|---|
| SU | 1479349 A | * | 5/1989 | | B65B/9/06 |
| SU | 1491767 A | * | 7/1989 | | B65B/9/06 |

* cited by examiner

Primary Examiner—Stephen F. Gerrity
(74) Attorney, Agent, or Firm—Carter Schnedler & Monteith

(57) ABSTRACT

A vertical pouch forming, filling and sealing machine and method for making pouches and filling same with a liquid content in the range of about 5 to 20 liters, is described. As a pouch is being filled with a liquid it descends into a support cage to restrain the pouch from ballooning out and prevents the weight of the liquid in the filled pouch from tensioning the film in the hot horizontal seal zone of the horizontal sealer. The support cage compensates for loss of surface tension of the film in the hot horizontal seal zone during the horizontal sealing cycle. The cage also has a gate section to discharge the filled pouch by gravity after the horizontal sealing cycle.

33 Claims, 10 Drawing Sheets

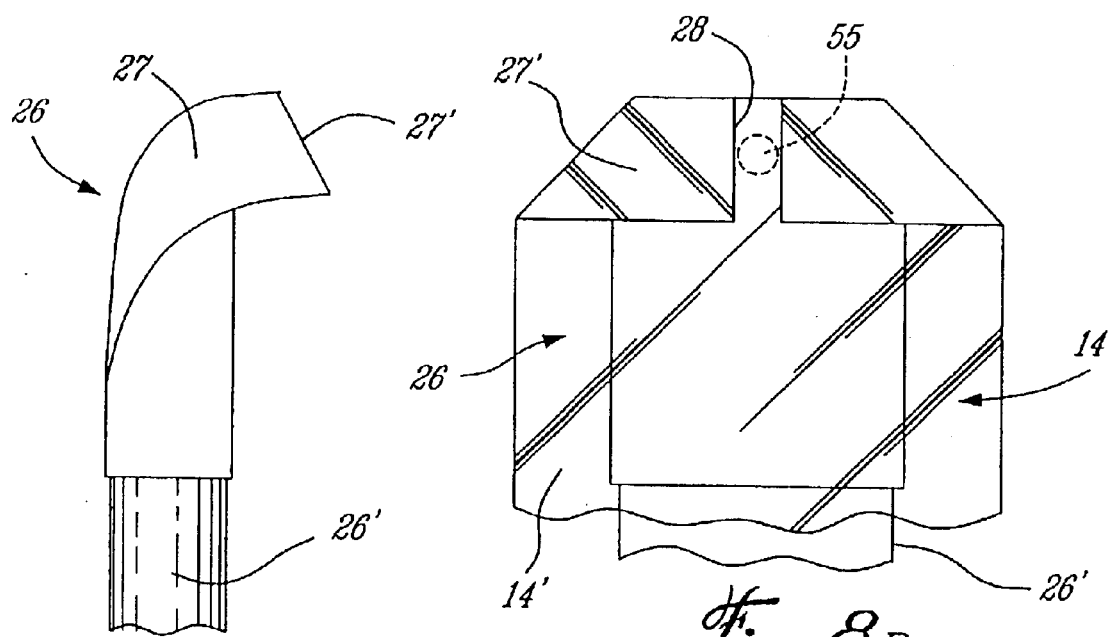
Fig. 8C
Fig. 8B
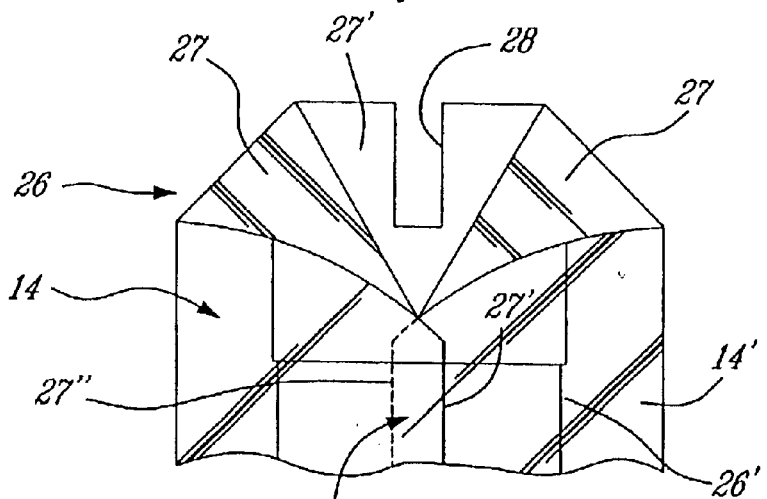
Fig. 8A
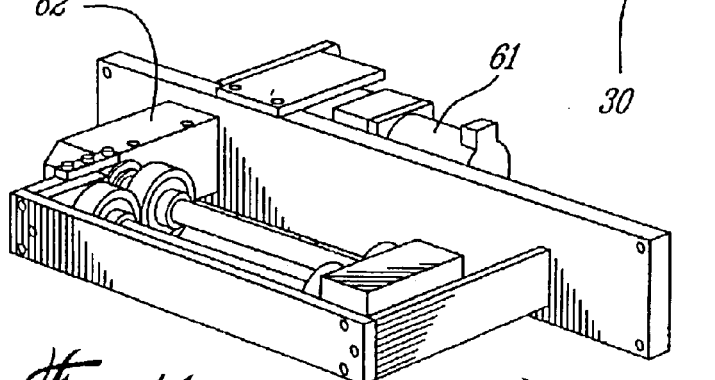
Fig. 7

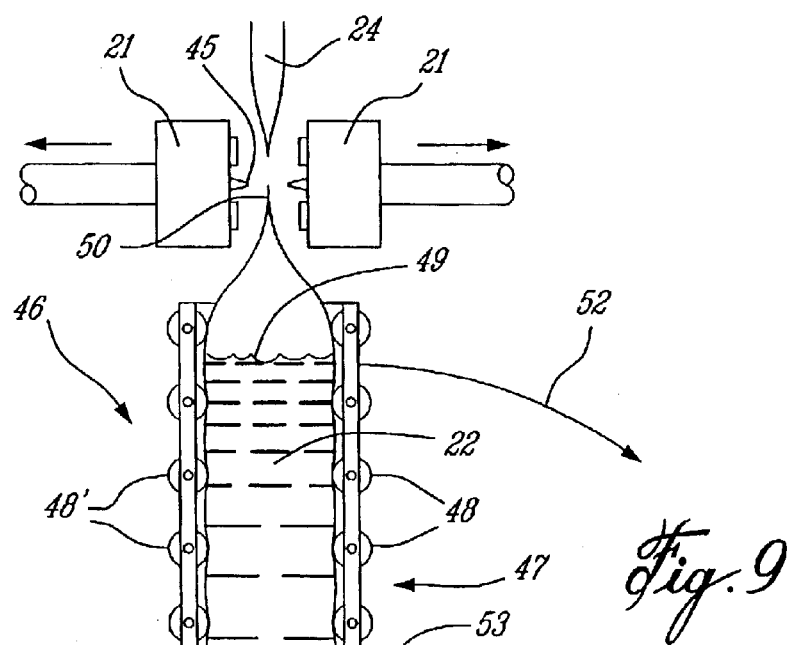
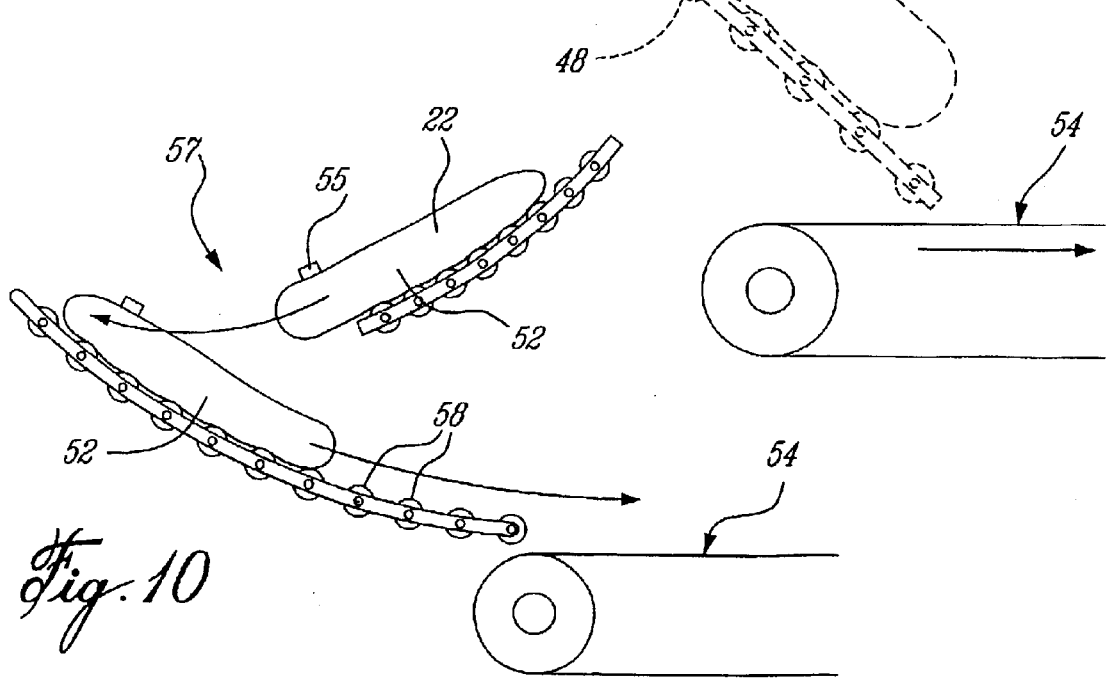
Fig. 9
Fig. 10

VERTICAL FORM, FILL AND SEAL MACHINE FOR HANDLING LARGE POUCHES

TECHNICAL FIELD

The present invention relates to a vertical pouch forming, filling and sealing (VFFS) machine for making pouches and filling them with a liquid content in the range of about 5 to 20 liters.

BACKGROUND ART

Traditionally, large plastic film pouches have been fabricated by bag fabricators and shipped to the converters to be filled with a content and then packaged in predetermined numbers in cardboard boxes for shipping to the end users where the bag contents are dispensed, usually through a valve that is secured to a side wall of the bags. This is a labour intensive and costly method as it involves many steps and extra costs in shipping. However, because of the size of these bags, usually capable of holding a liquid content in the range of 5 to 20 liters, it is the only method known to fill these bags as existing equipment is not suitable to fully automate the process.

SUMMARY OF INVENTION

It is a feature of the present invention to provide a VFFS filler for large pouches as above-described and which substantially overcomes the above-mentioned disadvantages.

According to the above feature, from a broad aspect, the present invention provides a vertical pouch forming, filling and sealing machine for making pouches with a liquid content in the range of about 5 to 20 liters. The machine comprises support means for supporting one or more supply rolls of film material. Guide means is provided to support and guide a film sheet from one of the supply rolls along a feed path. A film feed drive is provided for displacing the film sheet along the feed path and through a pouch former where a section of the film sheet is folded and disposed about a drop tube having a liquid fill tube therein. Vertical sealing means is provided to form a vertical seal along the folded film sheet. Horizontal sealing means is provided to form a bottom seal for a pouch to be filled and a top seal for a filled pouch. Severing means is provided to detach the filled pouch from the pouch to be filled. Support means is provided to support a pouch during the operation cycle of the horizontal sealing means to prevent the weight of the liquid in the filled pouch from tensioning the film in a hot horizontal seal zone of the horizontal sealing means to compensate for loss of surface tension in the film in the hot horizontal seal zone during a hot horizontal sealing cycle. The support means also constrains the pouch being filled to prevent it from ballooning out during the filling cycle. The support means has a discharge gate section to discharge the filled pouch after the horizontal sealing cycle.

According to a further broad aspect of the present invention there is provided a method of vertically forming a pouch from a continuous film sheet, filling the pouch with a liquid content in the range of about 5 to 20 liters and sealing the filled pouch. The method comprises the steps of drawing the film sheet from a supply roll and about guide means along a feed path and through a pouch former. The pouch former is secured at a top end of a drop tube. A section of the film sheet is folded about the bag former to form a folded film tube. The folded film tube is drawn about the drop tube in predetermined length cycles. The drop tube has a liquid fill tube therein. A vertical seal is formed along an overlapped film portion of the film tube and over the drop tube. A horizontal seal is formed by horizontal sealing means to form a bottom horizontal seal for a pouch to be filled with the liquid and simultaneously forming a top horizontal seal for a filled pouch. The filled pouch is severed from the pouch to be filled. The filled pouch is discharged and prior to severing the film pouch, the pouch to be filled is filled with a liquid as the pouch is being drawn in a support means for constraining the pouch to be filled in a cage. The pouch is constrained in the cage throughout the filling cycle to prevent the pouch from ballooning outwardly by the force of the liquid. The support means also supports the pouch during the horizontal sealing cycle to prevent the weight of the liquid in the filled pouch from tensioning the film in the hot horizontal seal zone of the horizontal sealing means whereby to compensate for loss of surface tension of the film in the hot horizontal seal zone during the horizontal sealing cycle.

BRIEF DESCRIPTION OF DRAWINGS

A preferred embodiment of the present invention will now be described with reference to the accompanying drawings in which:

FIG. 7 is a perspective view showing the construction of the feed drive;

FIG. 8A is a front view of the pouch former;

FIG. 8B is a rear view of FIG. 8A;

FIG. 8C is side view of FIG. 8A;

FIG. 9 is a schematic side view of the bag support cage;

FIG. 10 is a schematic side view illustrating a further embodiment of the discharge end of the support cage;

DESCRIPTION OF PREFERRED EMBODIMENTS

Figure 1:
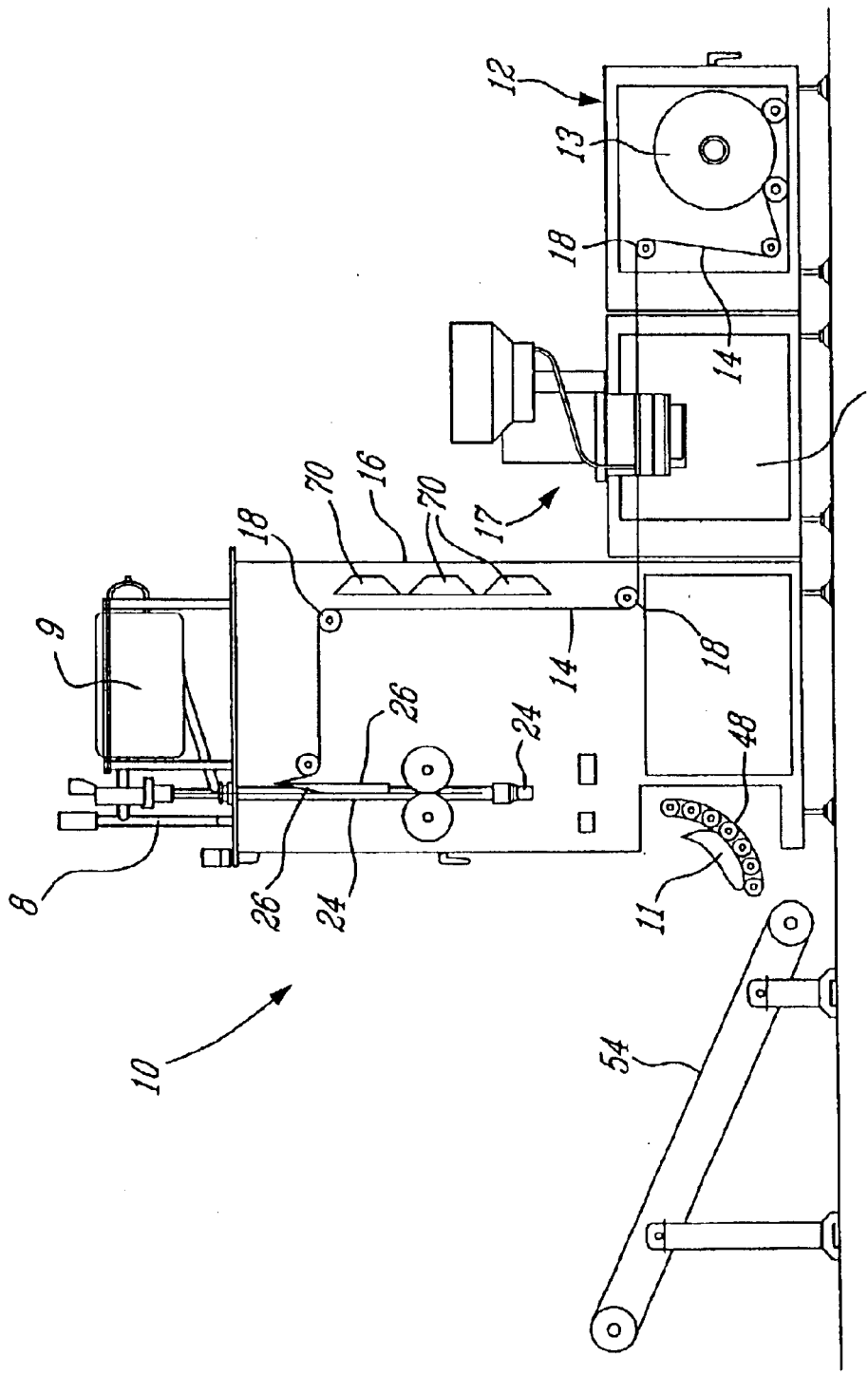
FIG. 1 is a schematic side view of a vertical pouch forming, filling and sealing machine constructed in accordance with the present invention.
Figure 2:
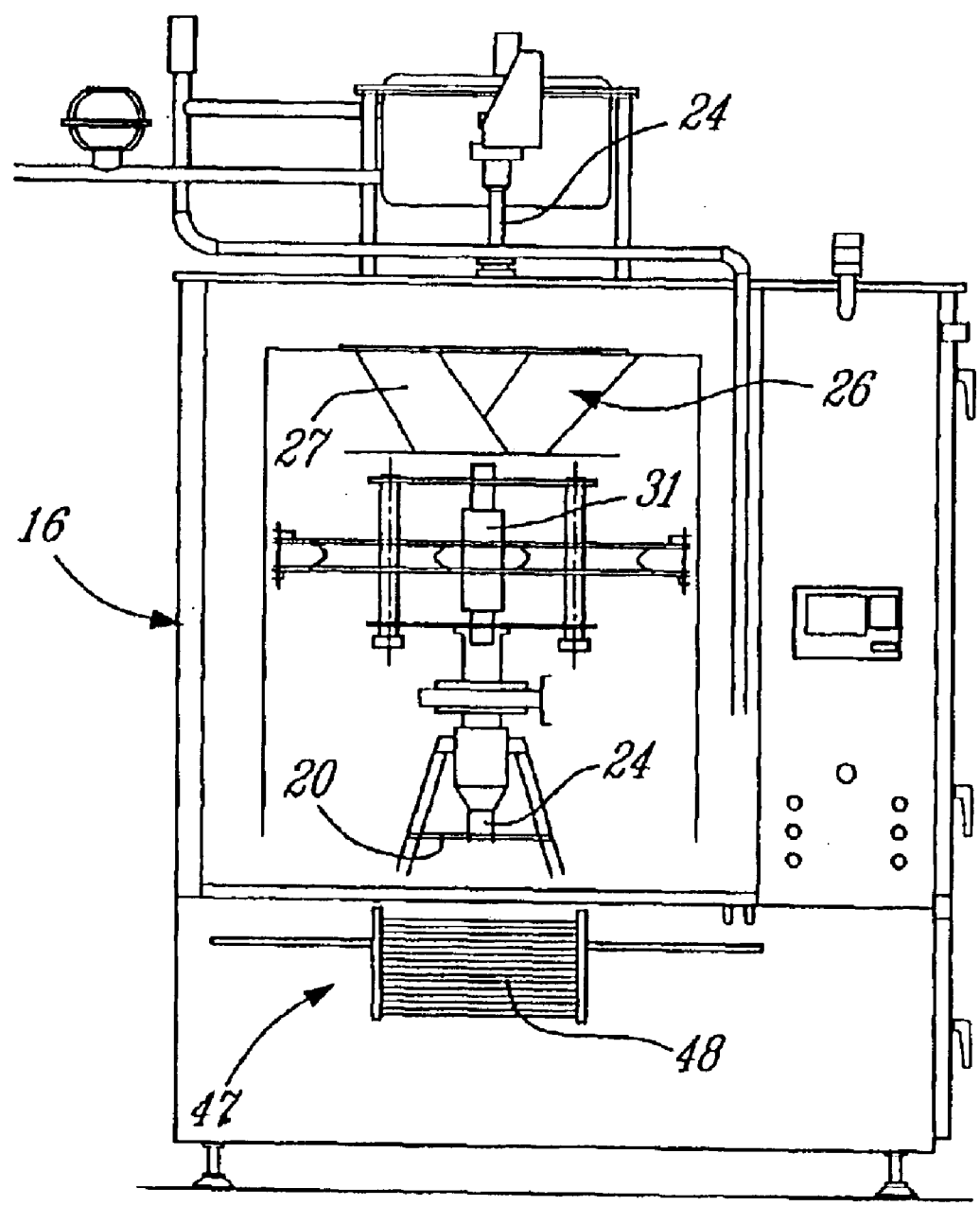
FIG. 2 is a front view of the machine as shown in FIG. 1.

Referring now to FIGS. 1 to 4, there is shown generally at 10 the vertical pouch forming, filling and sealing machine of the present invention for making and filling pouches 11 with a liquid content in the range of about 5 to 20 liters. This particular machine was constructed to form pouches with a 10 liter metered content. The machine comprises a feed roll housing 12 which is capable of housing one or more supply rolls 13 of film material in sheet form, herein a sheet 14 of a polyethylene base film material having a thickness in the range of from about 2.5 to 4 mil. In the particular machine illustrated in FIG. 1, a fitment applicator housing 15 is secured between the vertical form fill and seal (VFFS) housing 16 and the feed roll housing 12. This fitment applicator housing is an optional feature if a dispensing valve or handle or other fitment is to be secured to a pouch to be formed. The construction of the fitment applicator 17 will be described in more detail later, but as hereinshown, the fitment article is secured to the film sheet 14 prior to being fed into the VFFS housing 16.

The film sheet 14 is guided through the housings 12, 15 and 16 by a plurality of guide rolls 18 whereby the film sheet will follow a feed path through these housings and remain taught. As shown in FIG. 3A, a film sheet feed drive 19 is disposed above the horizontal sealing means, herein constituted by horizontal bar sealing assembly 20 having a pair of horizontal bars 21 which are pulsed with an electric current to provide a horizontal seal to a top end of a filled pouch 22 and to form a bottom seal for an uppermost pouch 23 to be filled with a liquid content discharged therein through a pair of feed pipes 24 connected to a top supply tank 9 which is continuously fed by suitable stainless steel piping 8. The feed drive 19 is of a type well known in the art and comprises a pair of opposed nip rolls 25 and 25' through which side edges of a folded film tube 14' is captured and advanced whereby to draw the film tube 14' through the machine.

Figure 3:
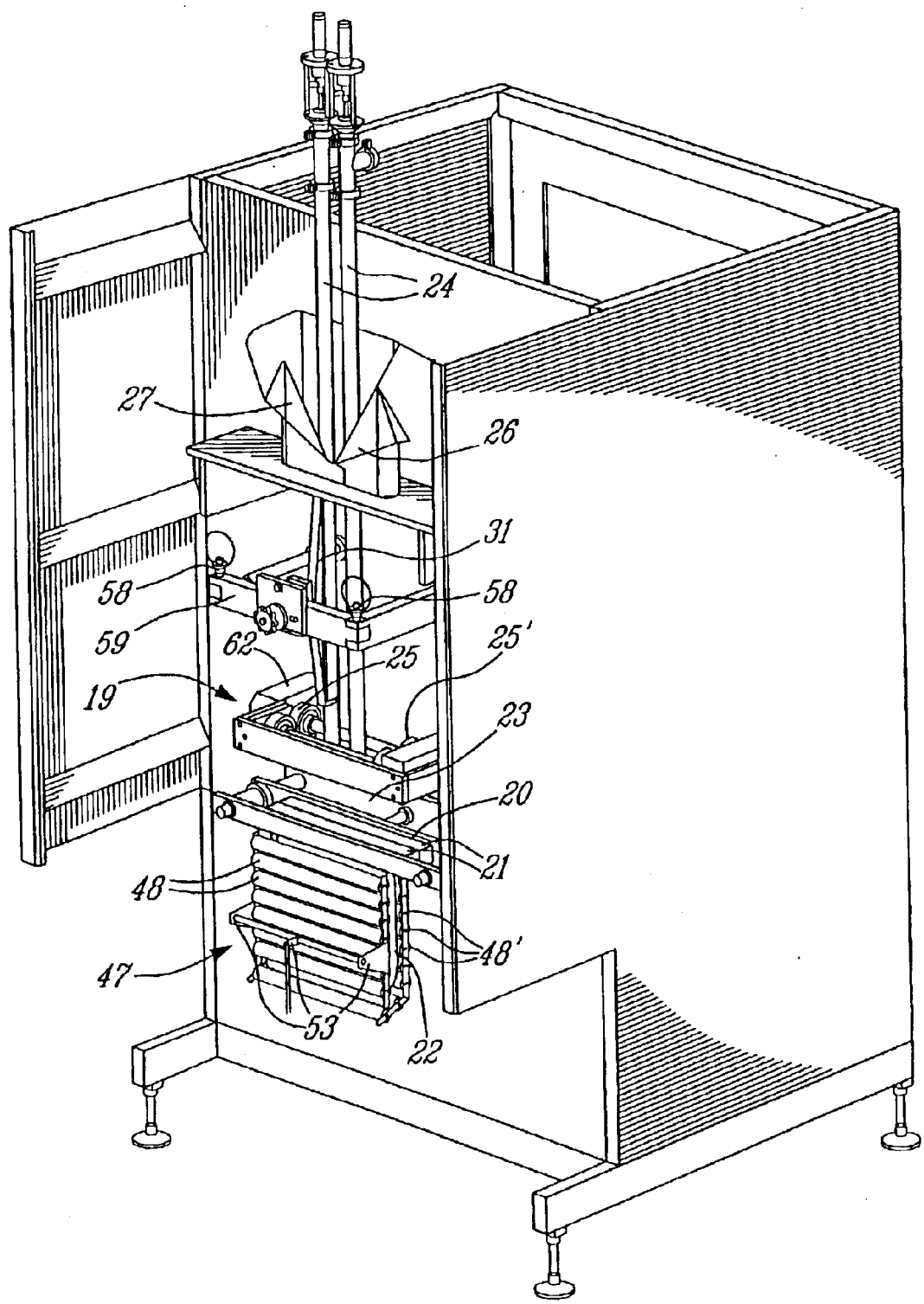
FIG. 3 is a perspective view illustrating the component parts associated with the pouch forming, filling and sealing sections of the machine and illustrating the construction of the support cage.

As shown more clearly in FIGS. 8A to 8C, the film sheet 14 is drawn over a pouch former 26 which is secured to the top end of a drop tube 26' which is of substantially oval transverse cross-section. The pouch former 26 comprises a stainless steel wraparound collar 27 which extends about the top end of the drop tube 26' and wraps around to form a rear collar portion 27' slanted outwardly from, and spaced from, the drop tube 26'. A slot 28 is provided in the rear portion 27' to permit passage of a dispensing spout 55 secured to the film sheet 14. The film sheet 14 is guided by the wraparound collar 27 to encircle the drop tube 26' and overlap at opposed vertical side edges 27' and 27" thereof to form an overlap region 30 where a vertical seal is to be applied. As the film sheet is drawn over the pouch former 26 it forms the oval film tube 14' and passes under a vertical sealing bar 31, as shown in FIG. 3, with the film tube 14' against the drop tube 26. The vertical sealing bar is applied against the film tube 14', when the film tube 14' has been stopped. The drop tube forms the backing for the vertical sealing bar.

Figure 11:
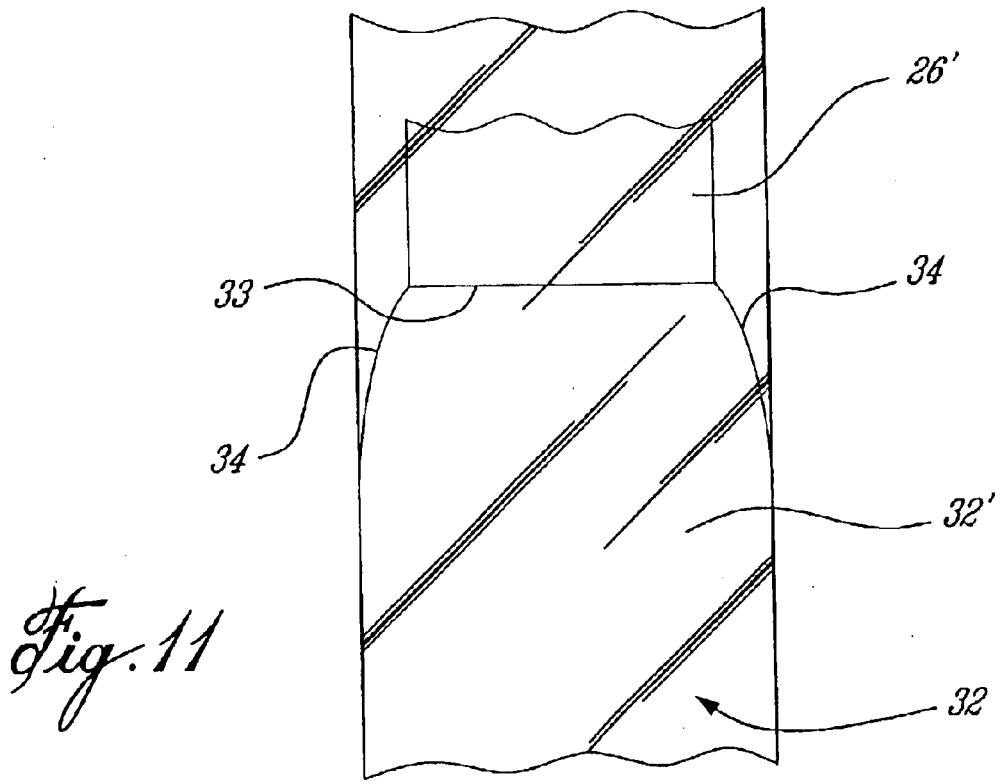
FIG. 11 is a schematic view illustrating the position of the spreader fingers at the bottom end of the drop tube to spread the film tube to form opposed flat side walls of a bag to be filled and sealed horizontally.

As shown in FIG. 11, as the film tube 32 exits the bottom end 33 of the drop tube 26', it is maintained spread out by spreader fingers 34 which may be spring-loaded or which may be actuated by a mechanism (not shown) to maintain the film tube 26' spread out with its opposed side walls 32' taught and parrellel with one another to eliminate any kinks from being formed in the film tube side walls 32' prior to forming a horizontal seal across the film tube.

Figure 4:
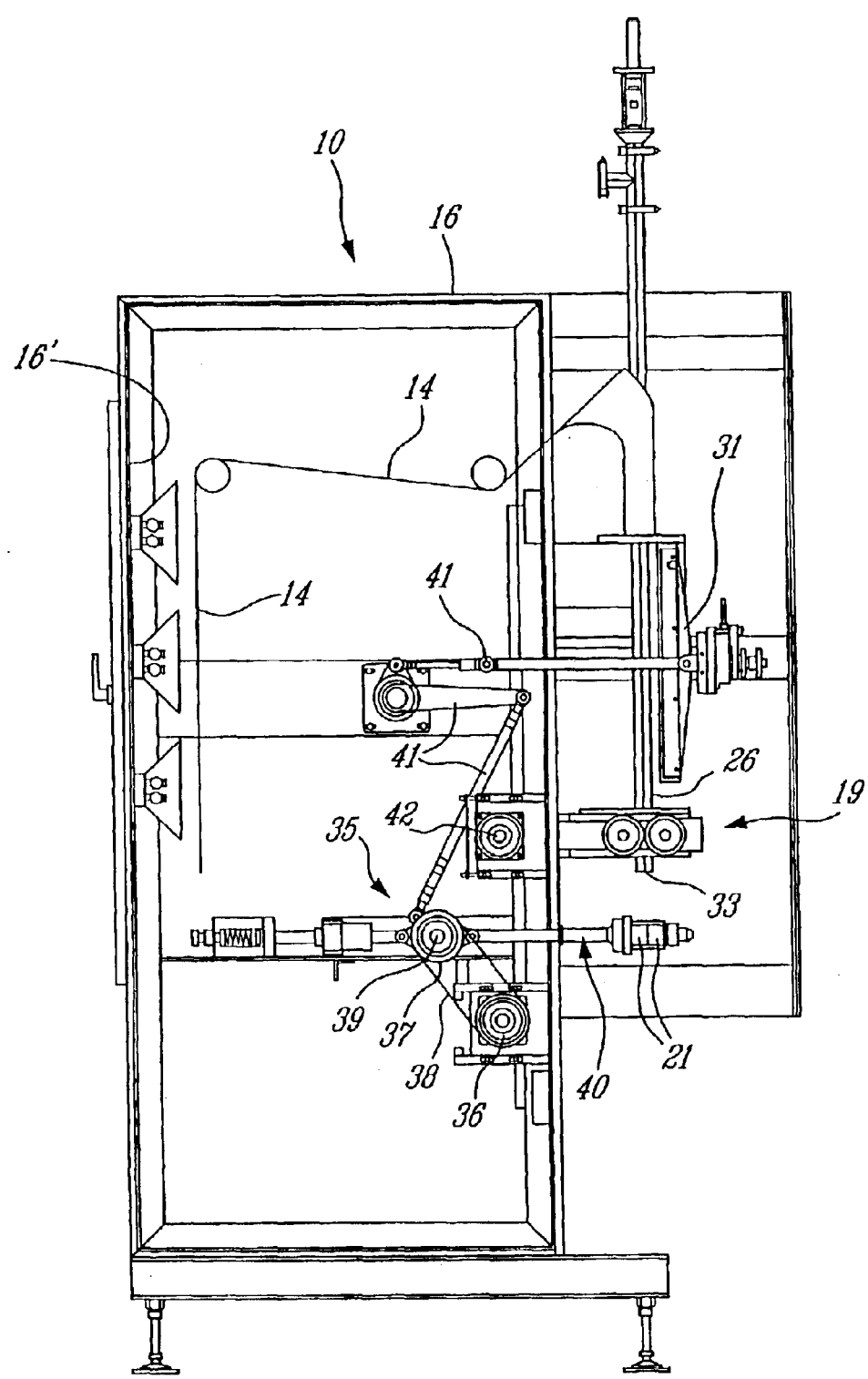
FIG. 4 is a side view showing another portion of the machine inside the primary housing and illustrating the linkage between the vertical and horizontal sealing bars.
Figure 6:
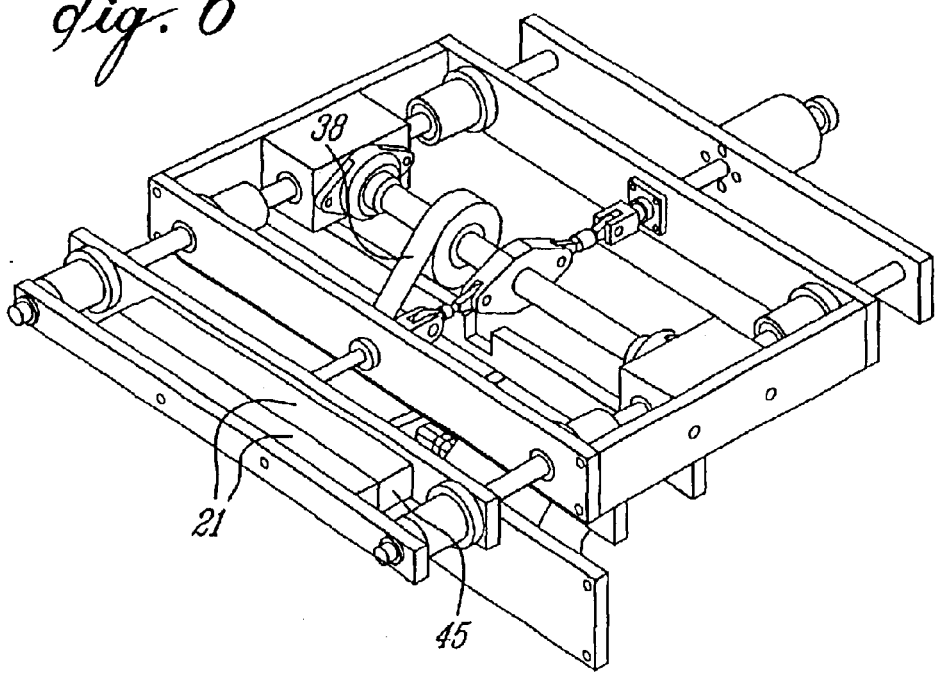
FIG. 6 is a perspective view showing the construction of the horizontal sealing bar.

As shown in FIG. 4, the horizontal sealing bars 21 are open and closed by an actuating mechanism 35 which comprises a drive motor 36 which is connected to a drive wheel 37 by a timing belt 38. The drive wheel 37 rotates a control shaft 39 to which is secured actuating bars 40 to open and close the horizontal sealing bars 21. Additionally, the drive shaft 37 is connected by a linkage 41 to operate the vertical sealing bar 31 in synchronism with the horizontal sealing bars 21. When these sealing bars are operated, the film sheet is held stationary by stopping the feed drive 19. As herein shown, the feed drive is driven by a motor 42 which is operated in synchronism with the motor 36. These sealing bars are pulsed current operated sealing bars and as shown in FIG. 6, the horizontal sealing bars 21 are provided with a sealing wire 45 at the center thereof. This sealing wire 45 constitutes a severing means to detach the filled pouch 22 from the pouch to be filled 23, during the operation of the horizontal sealing cycle.

With additional reference now to FIG. 9, there is shown the construction of a pouch support means 46 which is herein formed as a cage 47 formed of horizontal rollers 48 which constitute a rear wall, herein rollers 48' and a front wall, herein by rollers 48. These rollers are spaced apart a predetermined distance whereby to constrain the bag being filled as it descends in the cage 47 to prevent the bag 22, which is being filled with liquid, from ballooning out due to the pressure of its liquid content. If the pouch was to balloon out, it would be difficult to handle the pouch which would be unstable as it is being filled with liquid 49.

The pouch 22 illustrated in FIG. 9 is filled with liquid 49 and is sealed at the top end 50, but it is constrained into the cage by the rear and front roller walls. In order to discharge the filled bag 22 from the cage 47 after the bag is completely sealed, the front wall roller 48 is hinged on a bottom hinge 51 to be drawn outwardly downwards in the direction of arrow 52 by a cylinder operated linkage herein schematically illustrated at 53. When the front wall roller 48 is drawn downwards, as shown in phantom lines, the filled pouch 22 will collapse on the rollers 48 and be discharged on a discharge conveyor 54. This is done very quickly and the front wall is repositioned to receive the next bag being filled as it starts its descent into the cage.

As shown in FIG. 9, the bag which is drawn into the cage has a dispensing valve 55 secured thereto and this valve is located against the back wall rollers 48'. Accordingly, as the bag is discharged by gravity, as illustrated in phantom lines at 22, the cap 55 is disposed uppermost on the discharge conveyor 54. The back wall could also be constituted by a flat stainless steel wall.

Referring to FIGS. 9 and 10, there is shown an alternate embodiment of the discharge means of the cage and wherein the bottom end rollers 56 form a bottom trap wall and are connected to the hinge 51 whereby the pouch is released from under the cage 47. With such an arrangement, it is necessary to discharge the filled pouch 22 on an orienting slide 57 for positioning the filled pouch with the dispensing valve 55 facing up. As hereinshown, the pouch falls on the slide 57 and is directed to fall on a further slide 58 whereby the valve 55 is disposed upwardly. These slides would have a roller surface to facilitate the displacement of the bag on the slides. The second slide 58 is disposed such as to discharge the filled bag on the discharge conveyor 54.

Another important advantage of the support cage 47 is that prior to actuating the horizontal sealing bars, the filled pouch 22 is being supported in a substantially immovable manner within the cage. This prevents the heavy filled pouch from tensioning the film in the hot horizontal seal zone of the horizontal sealing bars. By supporting the bag, we compensate for the loss of surface tension in the film in this hot horizontal seal zone during the sealing cycle. Otherwise, the heavy filled pouch would stretch the film in the weakened seal zone and this could provoke leakage. The cage 47, although not shown, has adjustment features whereby to receive bags of different sizes. Alternatively, the cage could be made replaceable to suit bags of different sizes.

Figure 5:
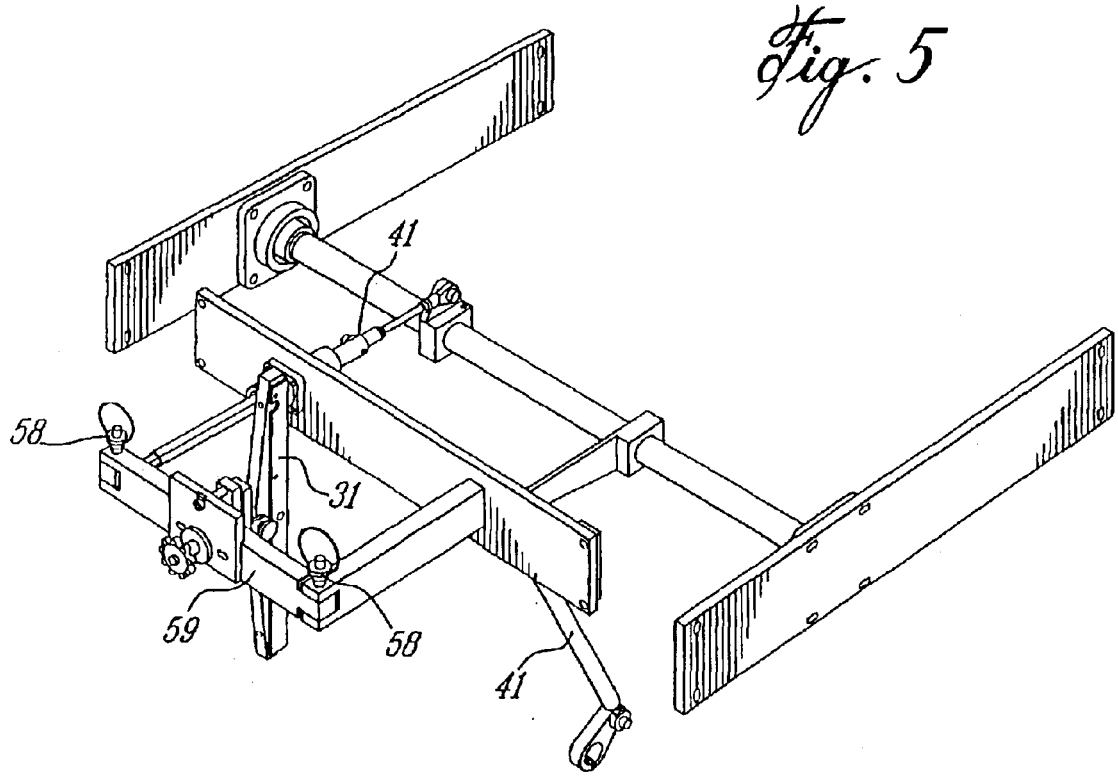
FIG. 5 is a perspective view showing the construction of the vertical sealing bar.

FIG. 5 is a perspective view illustrating the construction of the vertical sealing bar support mechanism as previously briefly described, as its construction is not at the point of the present invention and is well known in the art. However, as shown in FIG. 5, the vertical sealing bar is shown herein secured to a hingeable and removable locking bar 59 which hinges out and which is secured by lock pins 58 to permit servicing or replacement of the vertical sealing bar.

FIG. 6 shows in more detail the construction of the horizontal sealing bar assembly which was described with reference to FIG. 4 and simply shows another view of its constituent parts and it is a mechanism which is also well known in the art and accordingly a detailed description thereof will not follow. Similarly FIG. 7 is a more detailed diagram showing the feed drive 19 and as hereinshown, it is driven by a drive motor 61 through a drive train located in a housing 62. Again, this feed-drive is also well known in the art and will not further be described herein.

Figure 12:
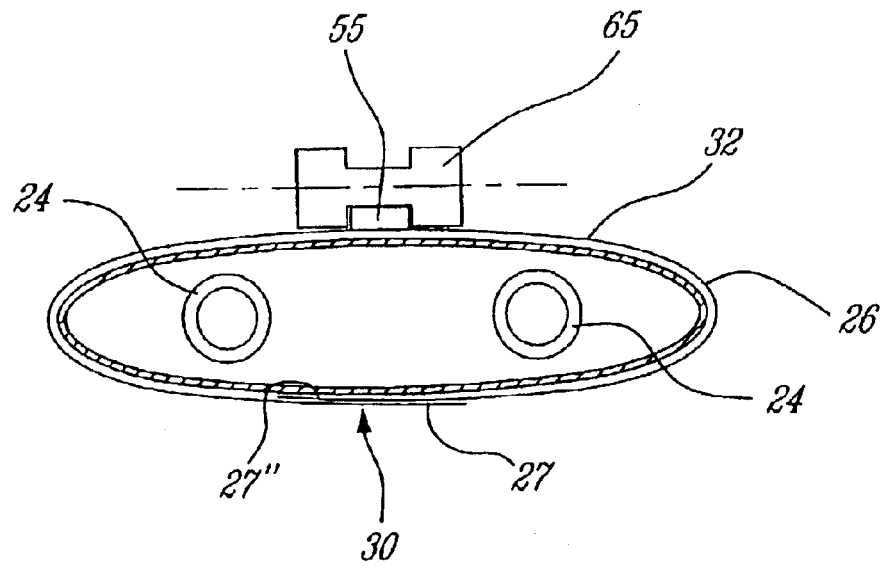
FIG. 12 is a top view showing the position of a split roller biased against the film being displaced about the drop tube.

FIG. 12 is a top view showing a split roller 65 which is biased against the drop tube 26 with the folded overlapped region 30 of the film tube 32 interposed between the split roller 65 and the drop tube 26. The split roller 65 rolls as the film is drawn through the machine and maintains a light pressure on the film for sealing and permits the passage of the dispensing valve or cap 55 thereunder.

As shown in FIGS. 1 and 4, the VFFS housing 16 is further provided with sterilization means in the form of ultraviolet lamp sources 70 which are disposed against a rear wall 16' of the housing 16 with the film path exposing the film sheet 14 to the ultraviolet light whereby to sterilize the film prior to forming the pouches.

Figure 13:
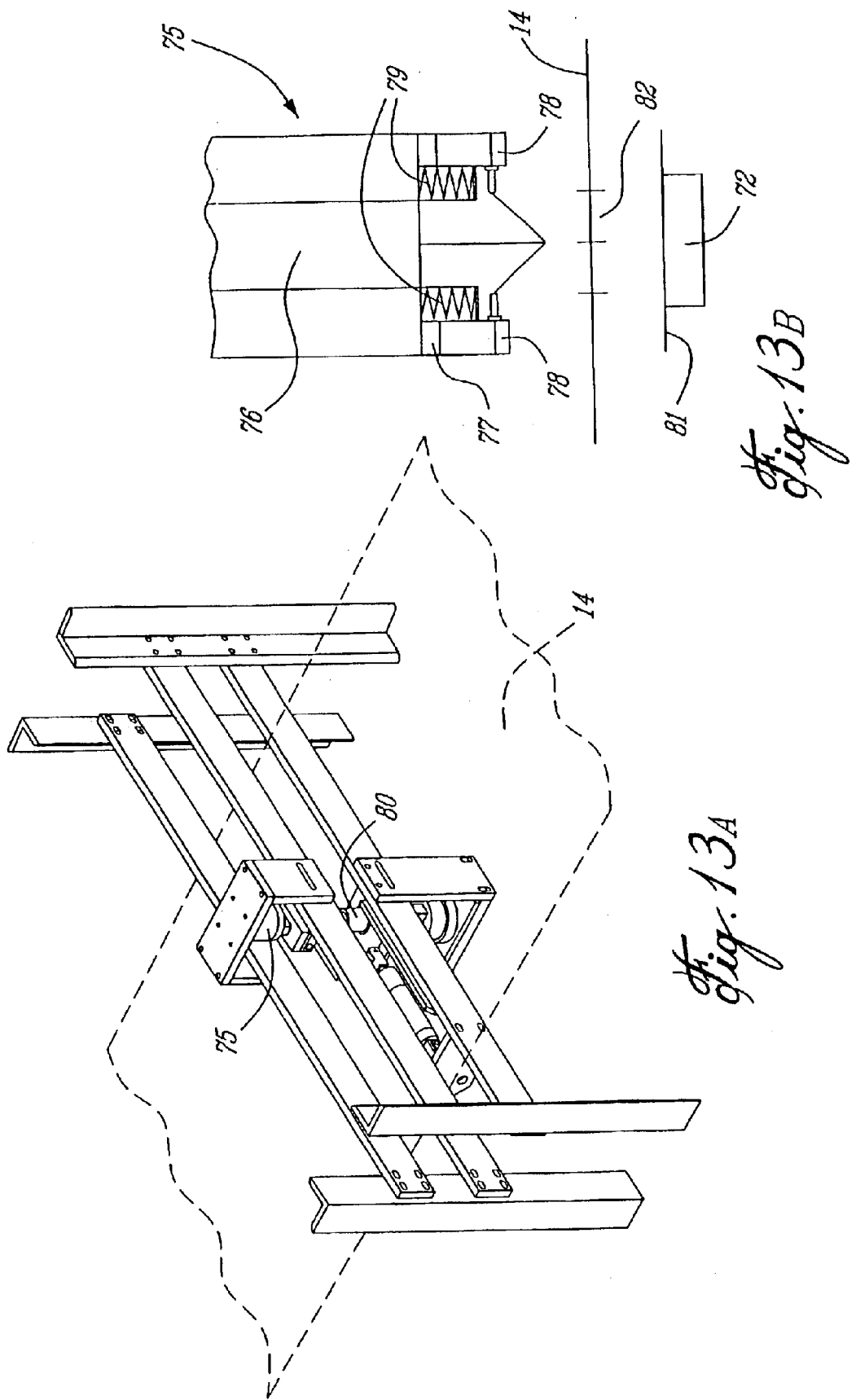
FIG. 13A is a perspective view showing the construction of a fitment applicator for securing a dispensing valve to the film sheet.
FIG. 13B is a simplified view illustrating the slitter punch and fusing head assembly of the fitment applicator.
Figure 14:
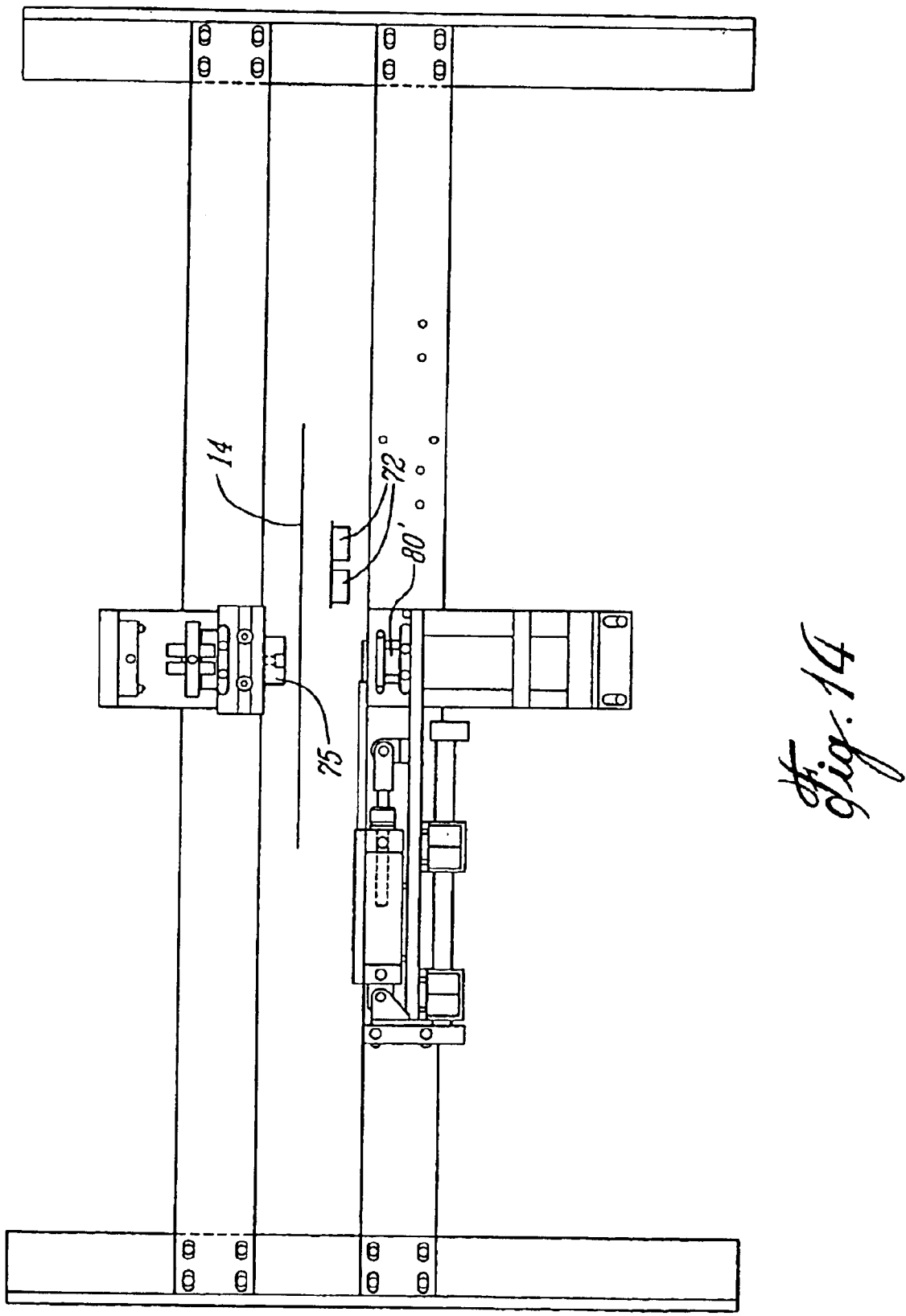
FIG. 14 shows another modified version of a fitment applicator for securing a dispensing valve to the film sheet.

Referring now to FIGS. 13A, 13B and 14, there will be briefly described two versions of the fitment applicator, herein the fitment being a dispensing valve 72, as shown in FIGS. 13A and 14. FIG. 13A shows the mechanism for applying the dispensing valve 72 and it comprises essentially a fusing head assembly 75, as illustrated in FIGS. 13A and 13B, with the head assembly having a slitter punch 76 projecting from a lower circumferential face 77 thereof. A ring sealing pad 78 is disposed on the lower surface 77 and is also pulsed current post-operated. The slitter punch is spring-loaded by a coil spring 79. Therefore, as the fusing head assembly 75 descends over the film sheet 14, it will first slit the sheet into a cross-slit or star-slit. The valve 72 is then positioned in line with the slitter punch by a valve support 80 and disposed against the rear side of the film 14 whereby as the fusing head assembly descends on the film, it will fuse a flange 81 of the dispensing valve assembly onto the film and about the slit area 82. Accordingly, the slit area is sealed by this fused flange 81. By slitting the film 14, film panels are formed but not detached from the film. Accordingly, there are no loose film pieces which are detached and which could find themselves in a bag filled with a liquid.

FIG. 14 shows a slightly different arrangement wherein when the film is stopped one valve fitment 72 is picked up by a transport assembly 80' and at the same time the slitter punch assembly 75 is actuated to slit the film sheet 14. The valve 72 is then disposed in registry with the fusing head of the punch assembly. Accordingly, this is a two step cycle as opposed to the embodiment of FIGS. 13A and 13B wherein fitment applicator is a one step sequence.

It is pointed out that these pouches can now be fabricated and filled automatically by a machine and process in an efficient and sanitary manner whereby liquid such as milk, soft drink beverages, tea, flowable soft cheese and other similar products may be packaged automatically in large quantities.

Summarizing the operation of the process or method of operation of the machine as above-described, it consists of vertically forming a pouch from a continuous film sheet 14 of polyethylene based film material. The pouch is filled with a liquid content in the range of about 5 to 20 liters, herein a precise metered 10 liter amount and sealing the film pouch. The steps of the method comprise drawing the film sheet from a supply roll 13 and about guide rolls 18 along a feed path and through a pouch former 26 secured at a top end of a drop tube 26. A section of the film sheet is folded about the bag former to form a folded film tube 32. The folded film tube 32 is drawn about the drop tube in predetermined length cycles. A liquid filling tube, herein two filler tubes 24 which are disposed within the drop tube and protrude from a bottom end of the drop tube. A vertical seal is formed along an overlapped film portion of the film tube and over the drop tube by a vertical sealing bar 31. A horizontal seal is also formed by horizontal sealing jaws comprising two horizontal sealing bars 21 to form a bottom horizontal seal for a pouch to be filled with the liquid and simultaneously forming a top horizontal seal for a filled pouch. The filled pouch is severed from the pouch to be filled by a hot wire disposed in the horizontal sealing jaws. The filled pouch is constrained in a support cage. The pouch is filled with a liquid as the pouch is drawn into the support cage which constrains the pouch being filled during the filling cycle to prevent the pouch from being unstable by ballooning outwardly by the force of the liquid and for supporting the pouch during the operation cycle of the horizontal sealing bars whereby to prevent the weight of the liquid in the filled pouch from tensioning the film in the hot horizontal seal zone of the sealing bars. By holding the pouch stationary, we compensate for the loss of surface tension of the film in the hot horizontal seal zone during the hot horizontal sealing cycle.

In order to discharge the filled pouch from the cage, an outer wall of the cage is provided with rollers and it pivots outwardly to cause the pouch to fall on the front wall of the cage by gravity and to be guidingly displaced onto a discharge conveyor with its fitment valve facing upwardly. In another embodiment of the cage design, the pouch may be discharged from a bottom trap wall of the cage and then oriented by slides so that its fitment valve is also located upwardly on a discharge conveyor.

It is within the ambit of the present invention to cover any obvious modifications of the preferred embodiment described herein, provided such modifications fall within the scope of the appended claims.

What is claimed is:

1. A vertical pouch forming, filling and sealing machine for making pouches with a liquid content in the range of about 5 to 20 liters, said machine comprising support means for supporting one or more supply rolls of film material, a guide means to support and guide a film sheet from one of said supply rolls along a feed path, a film feed drive for displacing said film sheet along said feed path and through a pouch former where a section of said film sheet is folded and disposed about a drop tube having a liquid fill tube therein, vertical sealing means to form a vertical seal along said folded film sheet, horizontal sealing means to form a bottom seal for a pouch to be filled and a top seal for a filled pouch, severing means to detach said filled pouch from said pouch to be filled, pouch support means to support a bottom end of said pouch during the operation cycle of said horizontal sealing means to prevent the weight of said liquid in said filled pouch from tensioning said film in a hot horizontal seal zone of said horizontal sealing means to compensate for loss of surface tension of said film in said hot horizontal seal zone during a hot horizontal sealing cycle, said support means also restrains said pouch being filled to prevent it from being unstable by ballooning out during the filling cycle, said support means having a discharge gate section to discharge said filled pouch after said horizontal sealing cycle, said discharge gate section being a roller wall discharge gate to gravity discharge said filled pouch to a discharge conveyor.

2. A vertical pouch forming, filling and sealing machine as claimed in claim 1 wherein there is further provided a fitment applicator to seal a fitment article to said film sheet prior to feeding said film sheet to said pouch former.

3. A vertical pouch forming, filling and sealing machine as claimed in claim 2 wherein said fitment article is a dispensing valve to dispense a liquid from said filled pouch.

4. A vertical pouch forming, filling and sealing machine as claimed in claim 3 wherein said filled pouch is gravity discharged on said roller wall discharge sate with said dispensing valve disposed on a top side of said filled pouch.

5. A vertical pouch forming, filling and sealing machine as claimed in claim 4 wherein said support means is a cage support means dimensioned to constrain said pouch as it is being filled and descends in said cage to prevent said pouch from ballooning outwardly by the force of said liquid being discharged in said pouch through a spout of said fill tube.

6. A vertical pouch forming, filling and sealing machine as claimed in claim 5 wherein said cage support means comprises two spaced apart vertical roller guide walls positioned for friction engagement with a respective one of opposed side walls of said pouch, and a bottom roller support wall to supportingly engage said lower end of said filled pouch prior to actuation of said horizontal sealing means.

7. A vertical pouch forming, filling and sealing machine as claimed in claim 6 wherein a forward one of said two spaced apart vertical roller guide walls is provided with a pivot connection at a lower end thereof and actuable by a cylinder to tilt outwards and downwards on said pivot connection to cause said pouch to collapse on said forward guide wall with said dispensing valve facing up and to slide out over a plurality of spaced apart rollers forming said roller guide wall.

8. A vertical pouch forming, filling and sealing machine as claimed in claim 6 wherein said bottom roller support wall is a pivoted trap wall capable of discharging said filled pouch on orienting means for positioning said filled pouch with said dispensing valve facing up.

9. A vertical pouch forming, filling and sealing machine as claimed in claim 5 wherein there are two fill tubes disposed side-by-side along said drop tube to discharge said liquid simultaneously into said pouch to maintain said pouch substantially uniformly stretched out as it descends into said cage.

10. A vertical pouch forming, filling and sealing machine as claimed in claim 3 wherein said pouch former has a wrap-around collar secured at a top end of said drop tube to cause said film sheet to encircle said drop tube and overlap at opposed vertical side edges thereof to receive a vertical seal by a vertical seal bar actuable against a top portion of said drop tube and constituting said vertical sealing means, said drop tube having an oval transverse cross-section, and spreader finger secured to a lower end of said drop tube below said vertical sealing bar to stretch a film tube formed by said pouch former and vertical seal bar.

11. A vertical pouch forming, filling and sealing machine as claimed in claim 3 wherein there is further provided sterilization means disposed along said feed pipe adjacent said film sheet and forwardly of said pouch former whereby to sterilize said film sheet.

12. A vertical pouch forming, filling and sealing machine as claimed in claim 11 wherein said sterilization means comprises at least one ultraviolet lamp source.

13. A vertical pouch forming, filling and sealing machine as claimed in claim 3 wherein said fitment applicator has a star slit punch to form a slitted opening in said film sheet and about which a circumferential flange of said dispensing valve is sealed, said valve having a detachable cover secured over a top end of a dispensing tube thereof, and a detachable seal inside said tube removable from said top end of said dispensing tube.

14. A vertical pouch forming, filling and sealing machine as claimed in claim 2 wherein said fitment applicator is a stand-alone apparatus removably securable between a supply roll support section and a vertical form, fill and seal section of said machine.

15. A vertical pouch forming, filling and sealing machine as claimed in claim 1 wherein said severing means is a pulsed hot wire forming part of said horizontal sealing means, said horizontal sealing means being constituted by electrically pulsed clamping sealing bars.

16. A vertical pouch forming, filling and sealing machine as claimed in claim 1 wherein said film material is a polyethylene base film material having a thickness in the range of from about 2.5 to 4 mil.

17. A vertical pouch forming, filling and sealing machine as claimed in claim 1 wherein said liquid is one of milk, soft drink beverage, ice tea, or the like liquids.

18. A vertical pouch forming, filling and sealing machine as claimed in claim 1 wherein said content is a 10 liter metered content.

19. A vertical pouch forming, filling and sealing machine as claimed in claim 1 wherein said guide means is a plurality of guide rolls.

20. A method of vertically forming a pouch from a continuous film sheet, filling said pouch with a liquid content in the range of about 5 to 20 liters and sealing said filled pouch, said method comprising the steps of:
 i) drawing said film sheet from a supply roll and about guide means along a feed path and through a pouch former, said pouch former being secured at a top end of a drop tube,
 ii) folding a section of said film sheet about said bag pouch former to form a folded film tube,
 iii) drawing said folded film tube, in predetermined length cycles, about said drop tube, said drop tube having a liquid fill tube therein,
 iv) forming a vertical seal along an overlapped film portion of said film tube and over said drop tube,
 v) forming a horizontal seal by horizontal sealing means to form a bottom horizontal seal for a pouch to be filled with said liquid and simultaneously forming a top horizontal seal to form a filled pouch,
 vi) severing said filled pouch from said pouch to be filled,
 vii) filling said pouch to be filled with a liquid from said fill tube;
 viii) discharging said filled pouch, and during step (vii) effecting the step of drawing in a support means said pouch being filled for constraining said pouch to be filled in a cage, as it is filled with a liquid through said fill tube and throughout a filling cycle to prevent said pouch from ballooning outwardly by the force of said liquid and for supporting said pouch during the operation cycle of step (v) to prevent the weight of said liquid in said filled pouch from tensioning said film in a hot horizontal seal zone of said horizontal sealing means, said support means compensating for loss of surface tension of said film in said hot horizontal seal zone during a hot horizontal sealing cycle, said cage having a pivotal discharge gate, said gate being pivoted to cause said filled pouch to fall on said discharge gate and being guidingly discharged from said cage to a discharge conveyor means.

21. A method as claimed in claim 20 wherein said pivotal discharge gate is a pivoting outer wall of said cage, said step (vii) comprises pivoting said outer wall of said cage to cause said filled pouch to fall on said front wall by gravity.

22. A method as claimed in claim 21 wherein said cage front wall comprises a plurality of conveyor rolls and is pivoted at a lower end thereof, said roll effecting said step of guidingly displacing said filled pouch.

23. A method as claimed in claim 20 wherein said pivotal discharge gate is a pivoting lower support end wall of said cage, said step (vii) comprises pivoting said lower support end wall of said cage to cause said filled pouch to discharge by gravity on said end wall and on an orienting slide to position said filled pouch with a predetermined orientation on a discharge conveyor.

24. A method as claimed in claim 20 wherein said steps (v) and (vi) are effected simultaneously by said horizontal sealing means, said horizontal sealing means having opposed spaced parallel electrically pulsed horizontal sealing bars and an electrically pulsed hot severing wire intermediate said horizontal sealing bars.

25. A method as claimed in claim 20 wherein before step (ii) there is provided the step of fusing a dispensing valve to said film sheet with said sheet stationary.

26. A method as claimed in claim 25 wherein said step of fusing comprises punching a star slit into said film sheet when stationary, transporting and positioning said valve over said star slit, and fusing a circumferential flange of said valve about said star slit, and fusing said flange onto said film sheet.

27. A method as claimed in claim 25 wherein said step of fusing comprises holding said valve at a predetermined position on one side of said film sheet when stationary, and in a single stroke forming a star slit from an opposed side of said film sheet and centrally of said valve and applying heat on said film sheet about said star slit to fuse said film sheet on a circumferential flange of said valve.

28. A method as claimed in claim 20 wherein before step (ii) there is provided the further step of exposing an ultraviolet light source to said film sheet to sterilize said film sheet.

29. A method as claimed in claim 20 wherein said step (vii) comprises filling said pouch to be filled by two spaced-apart filler tubes positioned side-by-side to discharge said liquid substantially uniformly in said pouch to be filled to maintain said pouch stretched out.

30. A method as claimed in claim 29 wherein said step of discharging said liquid comprises discharging milk in said pouch to be filled.

31. A vertical pouch forming, filling and sealing machine for making pouches with a liquid content in the range of about 5 to 20 liters, said machine comprising support means for supporting one or more supply rolls of film material, a guide means to support and guide a film sheet from one of said supply rolls along a feed path, a film feed drive for displacing said film sheet along said feed path and through a pouch former where a section of said film sheet is folded and disposed about a drop tube having a liquid fill tube therein, vertical sealing means to form a vertical seal along said folded film sheet, horizontal sealing means to form a bottom seal for a pouch to be filled and a top seal for a filled pouch, severing means to detach said filled pouch from said pouch to be filled, pouch support means to support a bottom end of said pouch during the operation cycle of said horizontal sealing means to prevent the weight of said liquid in said filled pouch from tensioning said film in a hot horizontal seal zone of said horizontal sealing means to compensate for loss of surface tension of said film in said hot horizontal seal zone during a hot horizontal sealing cycle, said support means also restrains said pouch being filled to prevent it from being unstable by ballooning out during the filling cycle, said support means having a discharge gate section to discharge said filled pouch after said horizontal sealing cycle, said pouch former having a wrap-around collar secured at a top end of said drop tube to cause said film sheet to encircle said drop tube and overlap at opposed vertical side edges thereof to receive a vertical seal by a vertical seal bar actuable against a top portion of said drop tube and constituting said vertical sealing means, said drop tube having an oval transverse cross-section, and spreader finger secured to a lower end of said drop tube below said vertical sealing bar to stretch a film tube formed by said pouch former and vertical seal bar.

32. A vertical pouch forming, filling and sealing machine for making pouches with a liquid content in the range of about 5 to 20 liters, said machine comprising support means for supporting one or more supply rolls of film material, a guide means to support and guide a film sheet from one of said supply rolls along a feed path, a film feed drive for displacing said film sheet along said feed path and through a pouch former where a section of said film sheet is folded and disposed about a drop tube having a liquid fill tube therein, vertical sealing means to form a vertical seal along said folded film sheet, horizontal sealing means to form a bottom seal for a pouch to be filled and a top seal for a filled pouch, severing means to detach said filled pouch from said pouch to be filled, said severing means being a pulsed hot wire forming part of said horizontal sealing means, said horizontal sealing means being constituted by electrically pulsed clamping sealing bars, pouch support means to support a bottom end of said pouch during the operation cycle of said horizontal sealing means to prevent the weight of said liquid in said filled pouch from tensioning said film in a hot horizontal seal zone of said horizontal sealing means to compensate for loss of surface tension of said film in said hot horizontal seal zone during a hot horizontal sealing cycle, said support means also restrains said pouch being filled to prevent it from being unstable by ballooning out during the filling cycle, said support means having a discharge gate section to discharge said filled pouch after said horizontal sealing cycle.

33. A method of vertically forming a pouch from a continuous film sheet, filling said pouch with a liquid content in the range of about 5 to 20 liters and sealing said filled pouch, said method comprising the steps of:

i) drawing said film sheet from a supply roll and about guide means along a feed path and through a pouch former, said pouch former being secured at a top end of a drop tube, ii) folding a section of said film sheet about said pouch former to form a folded film tube, iii) drawing said folded film tube, in predetermined length cycles, about said drop tube, said drop tube having a liquid fill tube therein, iv) forming a vertical seal along an overlapped film portion of said film tube and over said drop tube,
v) forming a horizontal seal by horizontal sealing means to form a bottom horizontal seal for a pouch to be filled with said liquid and simultaneously forming a top horizontal seal to form a filled pouch,
vi) severing said filled pouch from said pouch to be filled,
vii) filling said pouch to be filled by two spaced-apart filler tubes positioned side-by-side to discharge said liquid substantially uniformly in said pouch to be filled to maintain said pouch stretched out;
viii) discharging said filled pouch, and during step (vii) effecting the step of drawing in a support means said pouch being filled for constraining said pouch to be filled in a cage, as it is filled with a liquid through said fill tube and throughout a filling cycle to prevent said pouch from ballooning outwardly by the force of said liquid and for supporting said pouch during the operation cycle of step (v) to prevent the weight of said liquid in said filled pouch from tensioning said film in a hot horizontal seal zone of said horizontal sealing means, said support means compensating for loss of surface tension of said film in said hot horizontal seal zone during a hot horizontal sealing cycle.

* * * * *